March 3, 1964  A. E. C. MERLIN  3,123,042
INDICATING OR MEASURING INSTRUMENT
Filed April 24, 1962  2 Sheets-Sheet 1
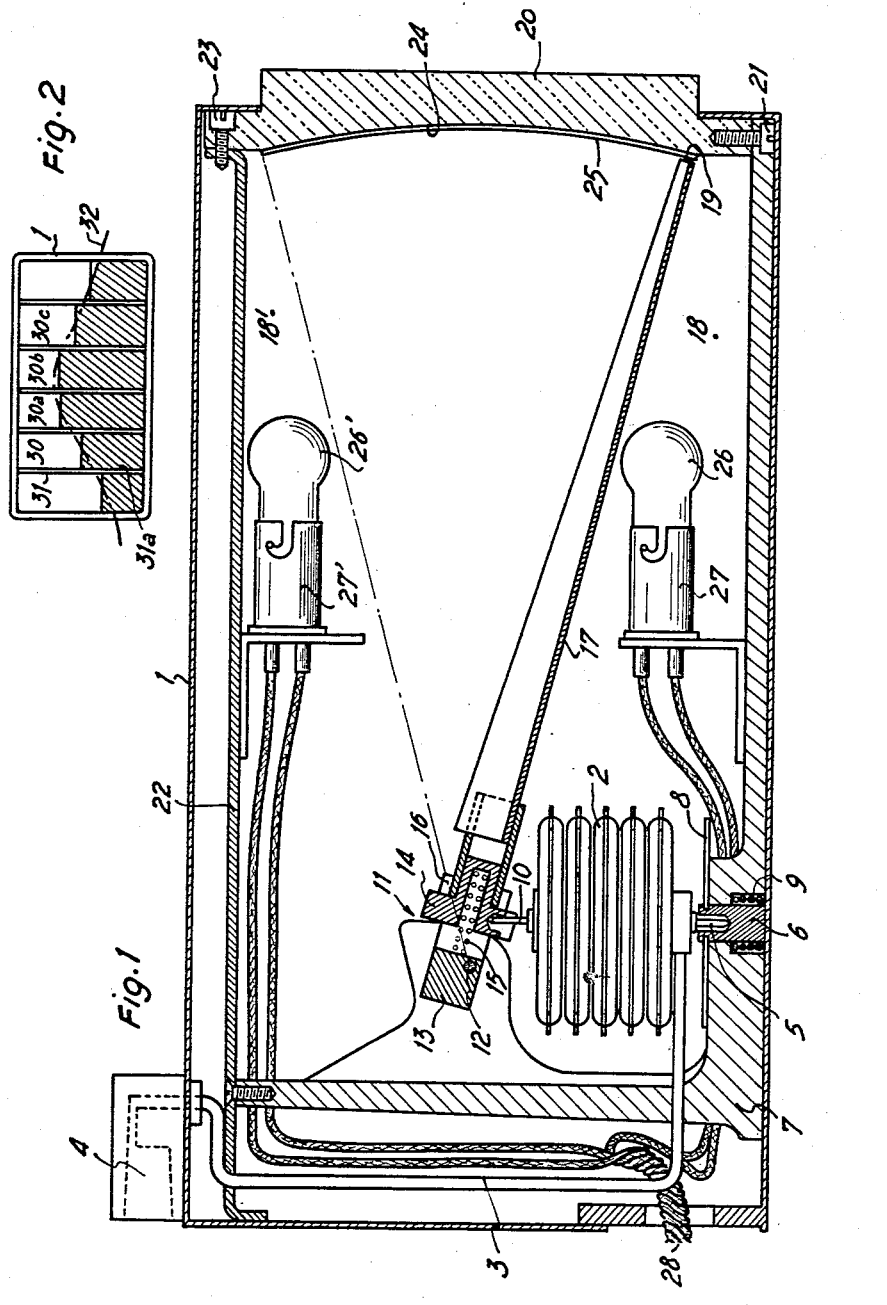

March 3, 1964  A. E. C. MERLIN  3,123,042
INDICATING OR MEASURING INSTRUMENT
Filed April 24, 1962  2 Sheets-Sheet 2
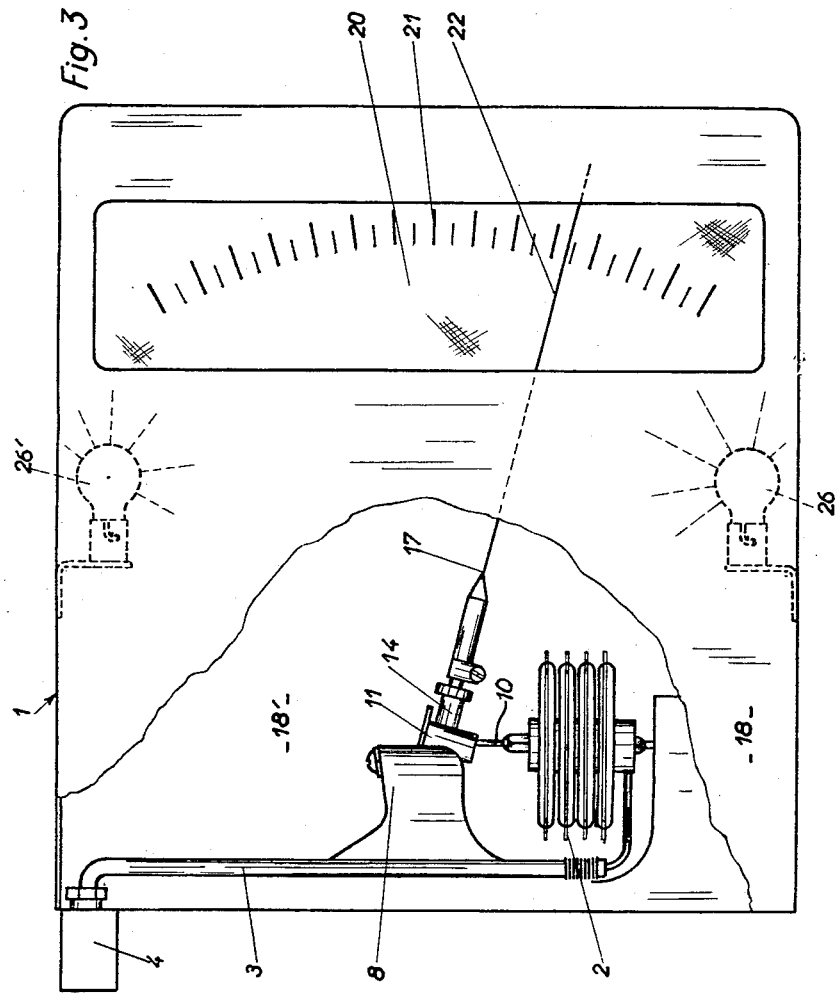
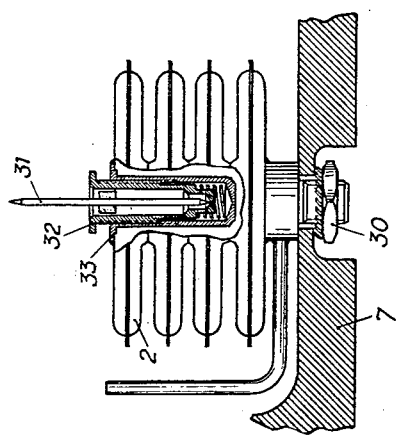

United States Patent Office 3,123,042
Patented Mar. 3, 1964

3,123,042
INDICATING OR MEASURING INSTRUMENT
André Emile Charles Merlin, Paris, France, assignor to Auxitrol, Paris, France, a company of France
Filed Apr. 24, 1962, Ser. No. 189,826
Claims priority, application France Apr. 28, 1961
11 Claims. (Cl. 116—129)

The present invention relates to an instrument for indicating or measuring variations in a physical or electrical quantity and to a special combination of such instruments.

It is usually by means of a needle or pointer moving in front of a graduated dial that a visual indication is given of the value of the physical or electrical quantity measured by the instrument controlling the needle or the pointer.

The need to check the exact position of a usually very slim pointer, the lighting of the dial, and the angle from which the operator views the dial are so many factors that have failed to find satisfactory solutions in instruments resorted to heretofore.

Although it is possible to avoid or attenuate errors of parallax by placing oneself correctly in relation to the needle or the pointer, this presupposes that the operator can move closer to the dial. On the other hand, this can prove extremely difficult when a large number of instruments have to be kept under observation virtually at the same time. Cases in point are control and monitoring rooms, in which the large number of measuring instruments leads to installing the operator in a central position from which he is always able to see all the instruments mounted on one or more control panels. In such cases, the distances involved makes it very difficult to observe the various needles or pointers closely.

A further source of error or imprecision is the very width of the pointers themselves.

An instrument according to this invention enables the drawbacks discussed above to be overcome.

An indicating or measuring instrument executed in accordance with the present invention comprises a device or transducer for converting variations in a physical or electrical quantity into movements of a partition, one edge of which is parallel to the inner face of a translucid dial and closely spaced therefrom, said partition dividing the interior of the instrument into two spaces, in at least one of which is disposed an electric bulb in such manner that when said partition shifts as a function of changes occurring in said physical quantity said edge marks off two contrasted zones of variable and complementary areas on the dial, the distance between said edge and the surface of the dial and also the thickness of said edge being such that the pointer viewed on the dial is constituted by the boundary line between the two luminous zones.

Recourse is preferably had to two light sources or lamp bulbs of different colours, one in each zone or compartment, in such manner that the measuring pointer seen travelling over the dulled and translucid dial be formed by the intersection of two luminous zones of different colours.

By an appropriate choice of colours, it is possible to ensure a visual display at a relatively large distance, while errors of parallax will for all practical purposes be eliminated regardless of the angle from which the dial is viewed, since the pointer, consisting of the intersection of the two luminous zones, has no thickness and moves along the graduated surface of the dulled and translucid material from which the dial is made.

In accordance with one embodiment of this invention, the dial is positioned at one extremity of the instrument tracing as a translucid wall, so that it is the forward edge of the partition that moves in parallelism with the inner face of the dial, closely spaced therefrom. Such an arrangement is particularly advantageous in cases where the instrument is to be incorporated in a panel.

In accordance with another particularly of the invention, a plurality of instruments of this type, or a plurality of units designed as disclosed hereinbefore and disposed in a common case, are so aligned side by side in determinate order that the form of the curve plotted roughly by the successive pointers of the dials placed side by side provide a visual display of the deviations of the detected values from the theoretical values of some typical curve or programmed curve.

Thus the indications furnished by each dial offer the advantages referred to precedingly, namely parallax-free visibility at a distance, while the difference between the indication given by one dial and those given by the adjacent dials will reveal such anomalies as may exist in the quantity indicated by that particular dial.

In this way, a glance will suffice for monotoring any multiple-parameter process, and the curve formed roughly by mentally joining the pointers of the successive dials relating to the various parameters will be required to coincide with the programmed curve.

The invention further has for its object to provide an alternative embodiment which would appear to be more suitable for portable or overhead instruments in particular, though this specific application is by no means a limitation on the scope of the invention. In accordance with this embodiment, the translucid dial is positioned on one of the lateral faces or wall of the instrument casing (in lieu of the front face), in such manner that it is one of the longitudinal edges of said partition that moves in substantial parallelism with said dial, closely spaced therefrom.

Such a disposition is more economical, particularly in the case wherein the partition separating the interior of the instrument into two spaces pivots about a fixed shaft, for with a dial positioned at one extremity of the instrument said dial must be cylindrical, with its axis coincident with the pivotal axis of said partition, whereas with a lateral dial the latter may have flat parallel faces set perpendicularly to said pivotal axis, and such a flat lateral dial may be provided with graduation marks adequate to permit the required measurements. Of course, it will be understood that a lamp bulb may be again disposed within each of the two spaces separated by the partition and that the pointer travelling over the dulled and translucid dial will again be formed by the boundary line between two luminous zones of different colours, i.e. by a pointer of zero thickness.

The description which follows with reference to the accompanying drawings, filed by way of example only and not of limitation, will give a clear understanding of the various features of this invention and of the method of carrying them into practice.

In the drawings filed herewith:
FIGURE 1 is a longitudinal sectional view of an indicating instrument according to the invention, the dial being shown disposed at one extremity of said instrument;
FIGURE 2 is a schematic illustration of a combination of a plurality of instruments or units executed in accordance with the invention;
FIGURE 3 is a plan view with partial cutaway of an instrument according to the invention, fitted with a lateral dial; and
FIGURE 4 is a detail view in fragmentary section of an alternative embodiment of the mechanism controlling the movements of the mobile internal partition.

Referring first to FIGURE 1, the measuring instrument shown thereon comprises a case 1 which houses an indicating instrument having an element adapted to detect a physical or electrical quantity. In the particular example illustrated, said element is a pressure detector, consisting for instance of a bellows 2 which receives the pressure to be measured through a flexible tube 3 and a union 4. Said detector reposes upon the support provided for the mechanism through the medium of a stub axle 5 which engages into a threaded adjustment part 6 screwed into a bearer 7 associated to the mechanism support. An easily accessible wheel 8 rigid with the part 6 is biased by a return spring 9.

On its opposite side, said detector is provided with a pin 10 which acts upon a compound lever or partition generally designated by reference numeral 11 and so mounted that it is pivotable about a pin 12 rigid with bearer 7 in response to the force exerted by the detector. Said compound partition 11 comprises a part 13 pivotable about pin 12 and an adjustment slide 14 mounted in said part 13 and urged by a spring 15 against an adjustment nut 16. The frusto-conical head of pin 10 is engaged into a thrust hole provided in slide 14.

The part 13 is rigid with a mobile vane or partition 17 of preferably small thickness which divides the internal volume of the case into two spaces or compartments 18 and 18'. The forward edge of said vane may have a thickness of the order of 3 to 4 tenths of a millimetre. Said vane is preferably co-extensive with the full width of the case (assuming FIGURE 1 to be a side elevation with vertical section), or with the full height of said case (assuming FIGURE 1 to be a plan view with horizontal section). The front edge 19 of said vane is positioned very close (as for example at a distance comprised between 0.2 and 1 mm.) from a dulled display means 20 forming, in part at least, one of the faces of said case. Said display means is secured to bearer 7 by one or more screws 21 and is also rigidly secured to a longitudinal plate 22 by one or more screws 23. It is provided with an inner concave surface 24 which is centered upon the pivotal axis 12, and said face may be provided with a translucid graduated member 25.

In each of spaces 18 and 18' is disposed an electric bulb (26, 26'), which bulbs are positioned clear of the sector swept by said vane between its terminal positions. Whereas a single bulb 26 (or 26') may be fitted, it may be found of advantage to fit two bulbs, as shown in FIGURE 1, to emit light of different colours. Said bulbs are carried in sockets 27, 27' connected by leads 28 to a convenient source of current.

Thus, changes in the physical quantity to be measured (the pressure in this case) are detected by the bellows 2 which pivots vane 17 about pin 12. With the two bulbs of different colours 26 and 26' energized, it will be seen that initially, with zero deflection of the vane, the sole colour visible on display 20 will be that of bulb 26'—white, say. As the pressure increases, the vane is caused to pivot and in so doing unmasks on the display an increasingly larger area having the same colour as bulb 26—red, for instance. Since edge 19 of said vane follows the inner surface of the display very closely over its full depth (or width), a sharp boundary line will be obtained between the two lighted areas, which boundary line serves as a pointer that can be read far more easily than an ordinary pointer. In addition, errors of parallax are reduced to a minimum since the separation between the two lighted areas is effected virtually on the graduated scale provided on the dial. Thus, the indication given will be visible at considerable distances and will furthermore be accurate regardless of the angle from which the display is viewed.

It should be noted that the pointer visible on the display has no thickness, since it consists of the boundary line between two areas and not the edge of the vane. For this condition to obtain, however, suitable values must be chosen both for the thickness of the edge of the vane and for the gap between the edge of the vane and the inner surface of the display means. Highly satisfactory results have been obtained with the values mentioned hereinabove.

The embodiment hereinbefore described allows for the usual operating adjustments. By acting upon the wheel 8 rigid with the part 6, the thrust point 5 of the detector can be shifted in the direction of movement of said detector. In addition, adjustment of nut 16 shifts the thrust point 10 in a direction substantially perpendicular to the direction of displacement of detector 9.

Obviously, the pressure detecting element 2 has been described by way of example only, and it will be well understood by those skilled in the art that it is possible to utilize any other detector of variations in a physical or electrical quantity. In the same way, instead of utilizing a rotatable compound, recourse could be had to an opaque partition which is similar to the vane 17 but which moves in an entirely different way, in translation for example. It would accordingly suffice to so adapt the inner surface of display 20 that it be in substantial parallelism with the path followed by the front edge of the partition. Lastly, instead of using two bulbs of different colours, a single bulb could be employed if desired, the pointer of zero thickness then being formed on the display by the boundary line between an illuminated area and a non-illuminated area.

Furthermore, the pivotal compound lever or partition 13 may if desired carry adjustable means for operating electrical contacts which could be caused to operate in regard to some preset value of the variable, in such manner as to warn the operator when said preset value is reached, by controlling the lighting-up, the extinction or the winking, say, of said lighting bulbs, or alternatively the lighting-up or winking of other coloured or uncoloured bulbs incorporated in the instrument.

A useful application of the instrument according to this invention consists in grouping together a certain number of such instruments side by side on a same horizontal level, or one above the other along a same vertical line, in such manner that the difference between the indication given by any one dial and those given by the adjacent dial or dials reveal any anomalies in the quantity indicated by that dial.

Instead of grouping a plurality of instruments side by side, for example, it would also be possible to dispose, side by side in a single case 1, an assembly of units 30, 30a, 30b ... executed in similar fashion to the instrument shown in FIGURE 1 and separated by parallel walls 31, 31a, 31b ... (see FIGURE 2). Each unit would then comprise an internal partition or vane adapted to be shifted by such fluctuations in the physical quantity as are detected by the associated unit, while the boundary line between the two illuminated areas of different colours, shown on the dial of the unit, would indicate the value of the quantity being detected. By disposing the various units in an appropriate order, a single glance would suffice to ascertain deviations from the programmed curve 32 which is indicated by the chain-dotted line in FIGURE 2.

Referring now to FIGURE 3, there is shown thereon an embodiment of the invention which is more particularly designed for a portable or overhead instrument, like parts with reference to FIGURE 1 bearing like reference numerals. In this particular case, the vane 17 comprises at least one straight lateral edge moving at a small distance (0.2 to 1 mm. for example) from a flat dial 20 accommodated in one of the faces of the instrument case. Said dial 20 consists of a plate having parallel faces and made of some translucid material such as dulled glass or plexiglass. It is provided with the graduation marks 21 required for the measurements.

Operation of such an instrument is substantially the same as that described with reference to FIGURE 1. The indicating pointer 22 consists of the boundary line between two luminous areas of different colours, provided by the lamps 26, 26'. Since the edge of the vane hugs the inner surface of the dial 20 very closely, a very sharp separation is ensured between the two illuminated areas. As precedingly, parallax errors are thus eliminated from all readings, but this advantage is obtained in this case with a graduated dial having flat and parallel faces and not with a dial having at least one cylindrical face. It should be noted that, here again, the pointer seen on the dial is devoid of thickness, being formed by the boundary line between two illuminated areas and not by the edge of the vane. For this to be so, appropriate values must be chosen both for the thickness of the edge of the vane and for the distance separating the edge of the vane from the inner surface of the dial. It has been found, in particular, that excellent results can be obtained with a vane edge thickness of three to four tenths of a millimetre and a gap between said edge and the inner surface of the dial included between 0.5 and 1 mm.

Clearly, many modifications or substitutions of parts may be made in the embodiment hereinbefore described. As an example, the dial could carry graduation marks other than the circular marks 21 shown on the drawing. Similarly, two dials could be provided on two different faces of the instrument, each dial bearing a different scale, for instance. Alternatively, a single instrument could combine at least one flat dial of the type described precedingly and a frontal dial of the type illustrated in FIGURE 1, or else the instrument could combine a panoramic dial with three faces. Further, the terminal edge of the vane could be so contoured as to determine a toroidal inner shape for the display means, so as to take advantage of all the indicative qualities provided by said display means, which may be graduated or not.

Similarly, the mechanism or transducer for controlling motion of the vane in terms of fluctuations in a physical or electrical quantity may differ from that shown on FIGURES 1 and 3. In the particular method of construction illustrated in FIGURE 4, the bellows 2 is fixedly attached by its base to the bearer 7 by a nut 30. The elongations of said bellows are transmitted to the vane by the needle 31 bearing against the bottom of a slide 32, the position of said slide being adjustable by screwing it into or out of a blind tapped terminal piece 33 welded to the top of the bellows.

What I claim is:

1. An indicating or measuring instrument comprising a casing having a translucid wall; an opaque partition movably mounted in said casing and having an edge substantially contiguous to, and movable along, the inner surface of said wall, said partition dividing said casing into two compartments which are complementary and variable in relative size in accordance with the position of said partition, and said partition edge dividing said wall into two complementary areas which are variable in relative size in accordance with the position of the said partition; a transducer connected to said partition to convert variations in a measured quantity into corresponding displacements of said partition; and a light source in one of said compartments effective to illuminate the corresponding area of said wall; whereby a boundary line between two areas of contrasting illumination of said wall is provided as an indication of the position of said partition; the distance between said edge and the inner surface of said wall, and the thickness of said edge, being such that said boundary line between said areas appears as a thin and accurate index line characterized by the absence of parallax.

2. An indicating or measuring instrument, as claimed in claim 1, including a second light source in the other of said compartments; the two light sources being of different colors whereby the boundary line appears between two areas illuminated with different colors.

3. An indicating or measuring instrument, as claimed in claim 1, wherein the thickness of said edge is of the order of 0.3 to 0.4 mm., and the distance between said edge and the inner surface of said wall is between 0.2 and 1 mm.

4. An indicating or measuring instrument, as claimed in claim 1, wherein said partition is a relatively elongated rectangle in plan, and said edge is an end edge of said partition; said translucid wall being at one end edge of the instrument casing.

5. An indicating or measuring instrument, as claimed in claim 1, wherein said partition is a relatively elongated rectangle in plan; said edge being a relatively elongated side edge of the said partition; said translucid wall comprising a lateral wall of the instrument casing.

6. An indicating or measuring instrument, as claimed in claim 1, in which said casing includes a translucid end wall and a translucid side wall adjoining said end wall.

7. An indicating or measuring instrument, as claimed in claim 6, wherein said translucid side and end walls conjointly form a panoramic translucid area whose inner surface is a toroidal surface; the edge of said partition having a profile conforming to said toroidal surface.

8. An indicating or measuring instrument, as claimed in claim 1, wherein said partition is a relatively elongated, substantially flat vane pivotally mounted at one end in said casing.

9. An indicating or measuring instrument, as claimed in claim 1, including graduate markings on said inner surface of said translucid wall.

10. An indicating or measuring instrument, as claimed in claim 1, in which said instrument includes signal means integrated therewith to indicate selected, measured values.

11. A monitoring device comprising a plurality of indicating or measuring instruments, as claimed in claim 1 arranged in side-by-side relation with their translucid walls forming substantial continuations of each other whereby a curve of measured values may be observed by observation of the relation of the boundary lines of adjacent instruments.

References Cited in the file of this patent

UNITED STATES PATENTS 1,948,633 Rogers _____ Feb. 27, 1934

FOREIGN PATENTS 185,585 Austria _____ May 11, 1956